United States Patent [19]

Niederer

[11] 4,084,698
[45] Apr. 18, 1978

[54] EGG WEIGHING DEVICE
[75] Inventor: Floyd S. Niederer, Titusville, N.J.
[73] Assignee: Otto Niederer Sons, Inc., Pennington, N.J.
[21] Appl. No.: 704,854
[22] Filed: Jul. 13, 1976
[51] Int. Cl.² ............................................. A01K 43/08
[52] U.S. Cl. ..................................... 209/121; 177/246
[58] Field of Search .................. 209/121; 177/50, 246, 177/154

[56] References Cited
U.S. PATENT DOCUMENTS

| | | | |
|---|---|---|---|
| 2,246,597 | 6/1941 | Niederer | 209/121 |
| 2,692,133 | 10/1954 | Niederer | 209/121 |

Primary Examiner—Joseph W. Hartary
Attorney, Agent, or Firm—Albert Sperry; Frederick A. Zoda; John J. Kane

[57] ABSTRACT

Egg grading equipment of the type wherein a series of weighing devices each having a balance beam adjusted to respond to the weight of an egg of predetermined weight are provided with activating means which are cushioned or damped so as to render the weighing devices more sensitive, accurate and instantly responsive to the weight of the eggs being weighed whereby the accuracy and the speed at which the weighing operations are carried out can be materially increased.

5 Claims, 2 Drawing Figures

U.S. Patent    April 18, 1978    4,084,698
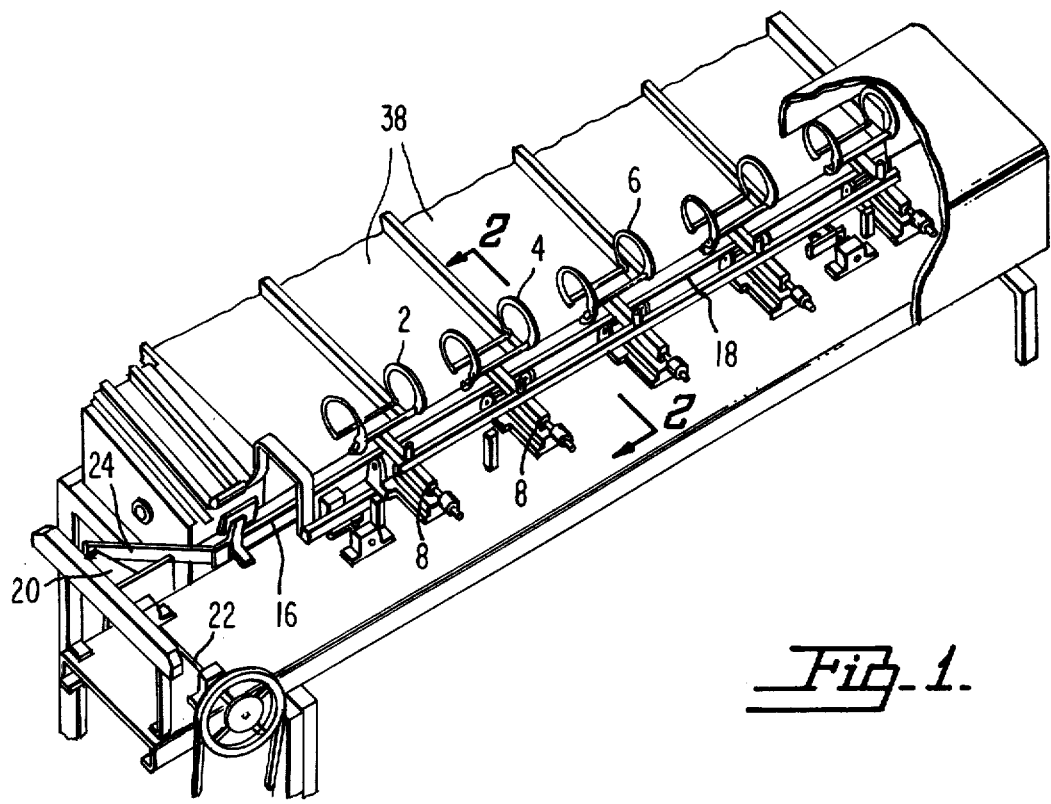
Fig_1.
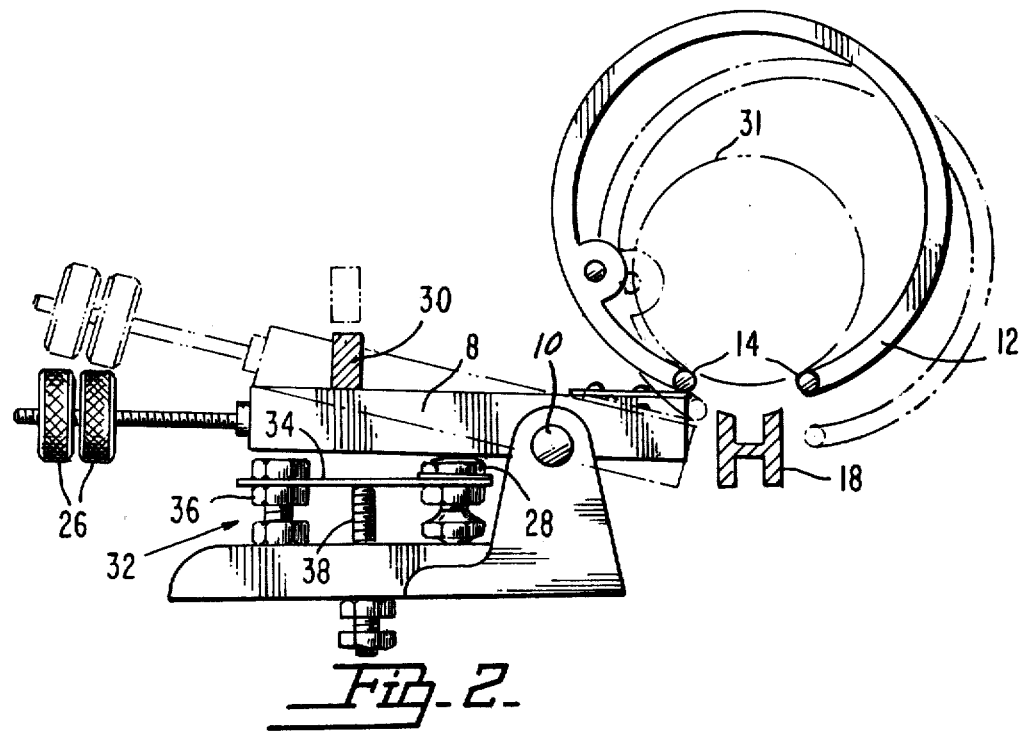
Fig_2.

EGG WEIGHING DEVICE

FIELD OF INVENTION

As disclosed in U.S. Pat. No. 3,672,501, egg grading equipment may be provided with a series of weighing devices each adjusted to respond to the weight of an egg of predetermined weight so as to discharge such an egg at a predetermined location relative to the equipment. Conveying means serve to move the eggs from one weighing device, or group of similarly adjusted weighing devices, to the next. The weighing devices each embody a balance beam and they are adjusted to respond to eggs of progressively decreasing weight so that the heaviest eggs are discharged first and those eggs of lesser weight are moved on to the next device or group of devices for discharge at a different location. In this way the eggs are graded by weight into various sizes such as "extra large", "large", "medium", "small" and "peewee" eggs.

The capacity of the egg grading equipment depends not only on the speed of movement of the conveying means as it advances the eggs from one weighing device to another, but also on the time required for the balance beam and its egg support to move from the position in which they are held when an egg is deposited thereon to the position in which they will serve to discharge an egg therefrom. Thus when an egg has a "borderline weight" closely approaching the weight for which an adjacent device is adjusted, the balance beam tends to tilt rather slowly. The time required to complete the weighing operation is then prolonged and the speed at which the eggs can be graded is reduced. Further since it is usual to provide some form of control device to prevent premature tilting of any balance beam and to assure return of the balance beam and its egg supporting means to a suitable position for receiving an egg, the inertia of the balance beam must be overcome in order to initiate its movement at the start of a succeeding weighing operation.

THE PRESENT INVENTION

In accordance with the present invention means are provided for activating the balance beam to initiate movement thereof so that the effect of its inertia is minimized and the device is capable of free and instant operation as soon as the control device permits the weighing operation to take place. The construction further serves to cushion the action of the balance beam so as to reduce shocks and dampen vibrations which might otherwise influence the weighing operation. The prompt and proper actuation of each weighing device is thereby assured and the delays and uncertainty in movement thereof are reduced. As a result, the various scales may be said to have a "floating action" and the accuracy and speed at which the eggs can be graded is materially increased.

This result is preferably attained by providing activating means, such as a spring element, which is compressed or biased between successive weighing operations and thereafter released to initiate movement of the balance beam at the start of each weighing operation. Further it is preferred to utilize the control device counter weights on the balance beam to bias or compress the spring of the activating means so that upon operation of the control device to release the balance beams for movement or upon initial movement of the balance beam, the activating means will be released to aid with the movement of the balance beam and egg supporting means toward an egg discharging position.

THE DRAWING

FIG. 1 is a perspective view of typical equipment embodying the present invention, and FIG. 2 is a sectional view of the equipment of FIG. 1 illustrating a preferred form of activating means for the balance beam.

PREFERRED EMBODIMENT

In that form of the invention chosen for purposes of illustration in the drawing, the equipment is designed for use in grading eggs by weight although the novel features of the invention are capable of use with other weighing devices and for grading other particles.

As shown in FIG. 1 the equipment embodies a series of weighing devices 2, 4, 6, etc., each of which has a balance beam 8 pivotally mounted at 10 and provided with egg supporting means 12 preferably including spaced rails 14. The weighing devices are arranged in a row with the egg supporting rails 14 of the various devices aligned and spaced to permit conveying means 16 to be moved longitudinally and vertically between the rails.

The conveying means 16 includes an elongated bar 18 connected to a crank arm 20 rotated by a shaft 22 and connected by a link 24 to one end of the bar whereas other means (not shown) serve to raise and lower the conveyor bar. In this way the conveyor bar is movable in a cyclic manner as shown and described in said U.S. Pat. No. 3,672,501 to advance the eggs from one weighing device to the next along the path of movement of the conveying means. The balance beams of the weighing devices are provided with counter weights 26 located on the end thereof opposite to that on which the egg supporting rails 14 are located and on the opposite side of the pivot means 10. The counter weights are adjusted in a known manner to cause the balance beam of the first weighing device (or group of devices) 2 to tilt and discharge the heaviest eggs therefrom while the weighing devices 4, 6, etc., serve to discharge eggs of progressively decreasing weight therefrom at predetermined points along the path of movement of the conveying means 16.

In order to assure return of the balance beams and egg supporting means to a predetermined position between successive weighing operations, stop means 28 are located beneath the balance beam and a control device such as the locking bar 30 is movable into and out of engagement with the upper surface of the balance beam to urge the balance beam toward the stop means 28. The control device, thus holds the balance beam and egg supporting rails in predetermined positions between the successive weighing operations and until an egg 31 has been deposited on the rails 14 for weighing purposes.

In accordance with the present invention activating means 32 are provided for promoting movement of the balance beam and egg supporting means toward an egg discharging position as shown in dotted lines in FIG. 2. For this purpose a yieldable element, or biasing means such as a coiled spring or a leaf spring 34 as shown, is secured to a stationary, but adjustable, mount 36 and to the stop means 28. The stop means is urged upward against the lower surface of the balance beam by the leaf spring 34. The stop means 28 and spring means 34 are depressed or biased upon downward movement of the locking bar 30 and counter balance weights 26 on the balance beam so as to position the balance beam and egg supporting means in their egg receiving position with the balance beam engaging the stop means 28.

Thereafter upon upward movement of the control device or locking bar to permit the eggs to be weighed, the leaf spring 34 urges the stop means 28 upward to initiate movement of the balance beam toward an egg discharging position. In this way the activating means serves to overcome inertia and any possibility for the balance beam to become stuck or adhere to the stop means. Such initial movement may be only very limited and should be insufficient to cause the balance beam and egg supporting means to discharge an egg from the weighing device. The movement instead is only sufficient to assure free tilting movement of the balance beam for accurate operation thereof in response to the weight of the egg. The amount of such limited movement may be adjusted in various ways, as for example, as shown in FIG. 2, by providing an adjusting screw 38 for controlling the upward thrust of the spring means 34 between the stationary mount 36 and stop means 28. As a result, the weighing operation is more delicately and rapidly effected and the time required to complete the weighing operation is reduced. Accordingly, the speed at which the eggs can be graded is increased.

The biasing of the activating means is thus effected by operation of the control device so that the coordinated movement of the control device, activating means and balance beam is assured at all speeds of operation of the equipment. In large scale operations the weighing devices are arranged so that several groups of devices are employed with the weighing devices in each group being adjusted to respond to eggs of a predetermined weight for discharge in a single area, as for example, separate trays 38 located along the path of movement of the conveying means. The eggs are thereby presented for further handling in groups wherein all eggs are of the same weight, say, large, medium, small or as otherwise graded.

The yieldable or spring element embodied in the activator may be of any suitable type and the equipment may be of any design required for the handling of the articles to be graded.

It will therefore be apparent that the form, construction and arrangement of the various elements of the combination are capable of modification and change without departing from the scope of the present invention.

I claim:

1. In egg grading equipment embodying a plurality of weighing devices, said weighing device each embodying a balance beam having egg supporting means thereon, means for depositing an egg on said egg supporting means, and means for holding said eggs supporting means in a predetermined position for receiving an egg, the combination of activating means for initiating movement of said balance beam and egg supporting means toward an egg discharging position after the deposit of an egg on said egg supporting means, said activating means including a stop means of a fixed, predetermined size engageable with the undersurface of said balance beam to limit downward movement thereof, said activating means further including a spring biasing means secured to said stop means to bias said stop means upwardly against the undersurface of said balance beam.

2. The combination as defined in claim 1 wherein said stop means is non-resilient.

3. The combination as defined in claim 1 wherein said stop means is adjustable in dimension to vary the fixed predetermined size thereof.

4. The combination as defined in claim 1 wherein said spring biasing means comprises a leaf spring means adapted to be stressed upon movement of said balance beam into a engagement with said stop means.

5. The combination as defined in claim 4 further comprising an adjusting screw engageable with said leaf spring to provide a means for adjusting the upward bias of said stop means against the undersurface of said balance.

* * * * *